July 5, 1966  H. J. DURST  3,259,722
COMPENSATING THERMOSTAT
Filed May 22, 1964
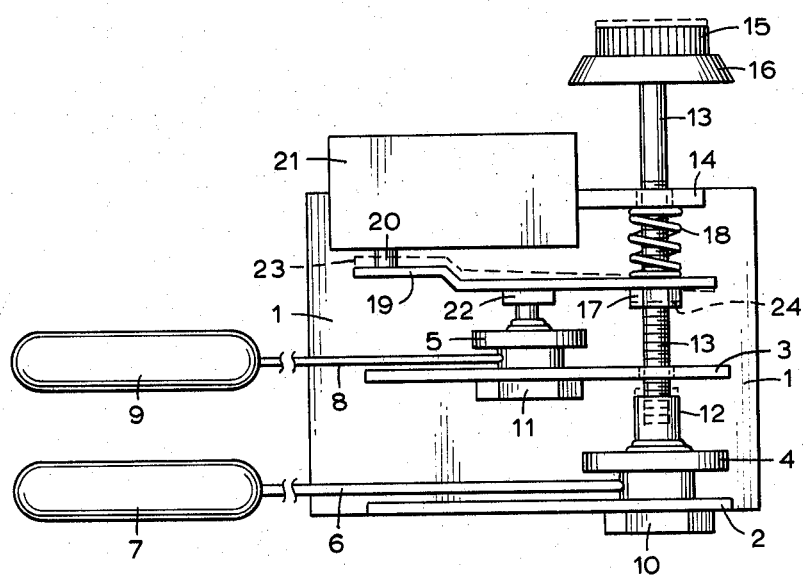
INVENTOR
HENRY J. DURST
BY
ATTORNEY

3,259,722
COMPENSATING THERMOSTAT
Henry J. Durst, St. Louis, Mo., assignor to Diatemp, Inc., St. Louis, Mo., a corporation of Missouri
Filed May 22, 1964, Ser. No. 369,492
3 Claims. (Cl. 200—140)

The principal object of my invention is to provide a thermostat which has a built-in ability to compensate for changes in ambient temperature. This can be illustrated best by an example. Let us consider the case of an ice-cube making machine which is thermostatically controlled. The thermostat in the machine, according to present practice, will be set to produce ice cubes at a certain level of temperature. That is to say that the ice-making refrigeration system will be set in motion automatically and turned off when the cubes resulting from the refrigeration are at a certain given temperature with reference to the ambient temperature around the machine. Now then, when the ambient temperature changes in one direction, the machine will produce ice cubes which are extra cold; in the other direction, a change of ambient temperature will produce half-melted or soupy ice-cubes. This is an aggravating situation, both because the product is not uniform, and because the process is continued too long in the first case, and the refrigeration process is stopped too soon in the latter case. With my self-compensating thermostat all changes in ambient temperature are automatically integrated into the performance of the thermostat and the thermostat operates at the corrected setting, as determined by the compensation requirement.

Another object of my invention is to provide a compensating thermostat utilizing two diaphragms, common in the thermostat art, in an entirely new and useful manner to form a single unitary structure which serves as a compensating thermostat.

An additional object of my invention is to provide a compensating thermostat which, utilizing a two diaphragm construction, places those two diaphragms in series-opposed configuration, so that one diaphragm acts in response to changes in ambient temperature, while the other diaphragm acts in response solely to variations from a given "set" temperature.

A still further object of my invention is to provide a structure for a compensating thermostat which uses a microswitch and a switch lever for said microswitch, the switch lever being actuated by one diaphragm, and the pivot point of said switch lever being established through the action of a second diaphragm.

A chosen embodiment of the invention has been submitted for illustrative purposes only. This embodiment should be viewed as being an example only, and not as a limitation of the invention, since there are many obvious uses for such a self-compensating thermostat. The invention, both as to its organization and its method of operation, will be best understood from the following description of the specific embodiment, in which:

FIGURE 1 is a side elevational view, showing the two diaphrgams in operation.

In FIGURE 1, I show a frame 1, in the form of a brass stamping. Frame 1 is provided with two diaphragm bases, numbered 2 and 3, in the form of two vertically disposed, shelf-like members. Each diaphragm base supports a diaphragm. Base 2 supports the diaphragm 4; base 3 supports the diaphragm 5.

Each diaphragm is connected by a tube to a bulb filled with thermoresponsive fluid in the conventional manner. Diaphragm 4 is connected by the tube 6 to the bulb 7. The diaphragm 5 is similarly connected by the tube 8 to the bulb 9.

At its lower end the diaphragm 4 passes through the diaphragm base 2; on the opposite side of the base 2 it is held in place by a nut 10, threaded on the lower end of the diaphragm 4.

At its lower end the diaphragm 5 passes through the diaphragm base 3; on the opposite side of the base 3 it is held in place by the nut 11, threaded on the lower end of the diaphragm 5.

At its upper end the diaphragm 4 terminates in a stud 12. Threaded into the stud 12 is the lower end of the adjusting screw 13.

The adjusting screw then is disposed in a sense vertical to the diaphragm bases 2 and 3; in fact it passes freely through the base 3, and in turn passes through the support bracket 14. At its upper end the adjusting screw 13 is provided with a knob 15 and indicator dial 16, in the customary manner.

Threadably disposed on the adjusting screw 13 is the pivot nut 17. Between the pivot nut 17 and the support bracket 14 is disposed the spring 18. The spring 18 is disposed around the adjusting screw 13 and is compressed against the support bracket 14 at its upper end, and against the switch lever 19 at its lower end. Thus the switch lever 19 is always maintained pressed downward against the pivot nut 17, by the pressure of the compressed spring 18.

At its opposite end the switch lever 19 is situated against the switch point 20 of the microswitch 21.

Between its ends the switch lever 19 is disposed against the stud 22 of the diaphragm 5. Expansion of the fluid in the diaphragm 5 can move the switch lever 19 and actuate the microswitch 21, when the movement is sufficient.

In operation let us consider the problem of the ice-making machine described above in the objects of the invention. The ice-making machine freezing process is controlled by the microswitch 21.

For such a situation we would locate the bulb 7 at some distance from the ice-making machine. This distance can be five or ten feet or more. Thus the bulb 7 will be maintained at a given temperature which is the so-called "ambient" temperature.

The bulb 9 is placed inside the ice-making machine, where it will measure and be at the temperature of the inside of the machine.

Now if the bulb 9 reaches the temperautre at which the microswitch 21 is set, the thermoresponsive fluid in the bulb 9 will expand through the tube 8 and expand the diaphragm 5 until the stud 22 of the diaphragm 5 actuates the switch lever 19. When this happens the switch lever moves to the dotted line position 23, actuating the microswitch 21 in turn.

The position or temperature at which this will happen is established simply by turning the adjusting screw 13. Turning the adjusting screw moves the pivot nut 17 longitudinally along the adjusting screw, closer and further away from the diaphragm base 3, depending on which sense of rotation is applied to the adjusting screw 13.

In the reverse process, when the bulb 9 drops in temperature, the fluid filling the bulb 9 contracts, thus the diaphragm 5 contracts and the stud 22 of the diaphragm 5 lowers in FIGURE 1, until the switch lever 19 relaxes away from the switch point 20. The spring 18 maintains the switch lever 19 against the nut 17 during this process.

If however, during either portion of the ice-making process, that is during either the son or off portion of the microswitch cycle, the ambient temperature changes, the following action takes place.

If the ambient temperature rises, the fluid in the bulb 7 expands. It expands through the tube 6 and expands the diaphragm 4. The diaphragm 4, in expanding, raises the stud 12, in FIGURE 1. Raising the stud results in raising the adjusting screw 13. When the adjusting screw 13 moves upward in FIGURE 1, the pivot nut 17 is raised along with all the related structure: the switch lever 19 is raised at its right end, in FIGURE 1, as is the spring 18 which is further compressed.

The result of the above action of the diaphragm 4 is that more expansion of the diaphragm 5 will be required to actuate the switch lever 19 to the switch position. That is, a greater change in temperature, measured at the bulb 9, will be required to actuate the microswitch 21, when the diaphragm 4 has raised the adjusting screw 13 and consequently the nut 17 to the dotted line position of the nut shown at 24.

Conversely, if the ambient temperature drops, the fluid in the bulb 7, the tube 6 and the diaphragm 4 will contract. This means that the diaphragm 4 will contract and the adjusting screw, together with the knob 15, the indicator dial 16, the pivot nut 17, the spring 18 and the switch lever 19 will drop in FIGURE 1. In this case the right end of the switch lever 19 having dropped, less expansion or contraction of the diaphragm 5 will be required to switch the microswitch 21 on or off.

Generally summarizing, the action of the bulb 7 and the diaphragm 4 works to move the temperature baseline from which the diaphragm 5 and its associated bulb 9 operate. The two diaphragms it will be remembered, operate from different temperature environments. One is responsive to ambient changes, one is responsive to temperature settings.

It will be easily recognized that the two systems, each composed of a bulb, tube and diaphragm, are acting in series opposition, in order to provide a type of compensating thermostat hitherto unknown.

It will be obvious to those experienced in the art of thermostat design that different objectives can be accomplished by varying the sizes of the bulbs 7 and 9. Actually I have found that by changing the ratio of the sizes of the two bulbs, the combination can be made to over compensate or to undercompensate. This will have many obvious advantages to those skilled in the art.

What this above means is that the combination can be adapted to have various shapes for the chosen compensation curve. The end points of the compensation curve are independent of each other since two separate but co-acting diaphragms are used. Thus the device can be made to over compensate, undercompensate, compensate exactly over a given range, or many other variations between.

While the example chosen, that of an ice-making machine, was a simple one, the embodiment of the invention shown was a simple one to make obvious the action of the device. It will be obvious to those skilled in the art of thermostat design that the invention may be variously embodied, and also that a great many changes, modifications, variations, alterations and arrangements may be made in the basic construction illustrated, without departing in any way from the scope of the invention. I do not intend that the invention be limited by any other scope than that defined in the attached claims.

What I claim is:

1. In a compensating thermostat of the class described, a frame provided with a pair of diaphragm bases and a support bracket disposed vertically thereto, a microswitch mounted on said support bracket, a pair of diaphragms, each one mounted on one of said diaphragm bases, a pair of diaphragm bulbs filled with thermoresponsive fluid, one bulb connected to each of said diaphragms, an adjusting screw threadably mounted on one of said diaphragms, and movably disposed through the diaphragm base associated with the second of said diaphragms, a pivot nut threadably disposed on and normally fixed with respect to said adjusting screw, a switch lever mounted at one end against said nut, said other end of said switch lever being between said second diaphragm and said microswitch, said microswitch mounted on said support bracket being provided with a switch point actuable by said second diaphragm through said switch lever.

2. In a compensating thermostat of the class described, a frame provided with a pair of diaphragm bases and a support bracket disposed perpendicular thereto, a microswitch mounted on said support bracket, a pair of diaphragms, each diaphragm being mounted on one of said diaphragm bases by means of a nut threadably attached to said diaphragm, a stud on each diaphragm, a pair of diaphragm bulbs filled with thermoresponsive fluid, one bulb connected to each of said diaphragms, to expand and contract said diaphragms in response to fluctuations in temperature, an adjusting screw threadably mounted on one of said diaphragms in the stud of said diaphragm, and movable both rotatably and slidably through the diaphragm base associated with the second of said diaphragms and said support bracket, a pivot nut threadably disposed on and normally fixed with respect to said adjusting screw, a switch lever mounted on said nut, said one end of said switch lever being between said second diaphragm and said microswitch, a spring disposed around said adjusting screw, between said support bracket and said lever, holding said switch lever against said nut, and said microswitch mounted on said support bracket being provided with a switch point actuable by said switch lever through expansion and contraction of said second diaphragm.

3. In a compensating thermostat of the class described, a frame provided with a pair of diaphragm bases and a support bracket disposed perpendicular to said frame, a microswitch mounted on said support bracket, a pair of diaphragms, each diaphragm mounted on one of said diaphragm bases by means of a nut threadably attached to said diaphragm, a stud on each diaphragm, a pair of diaphragm bulbs filled with thermoresponsive fluid, one bulb connected to each of said diaphragms, to expand and contract said diaphragms in response to fluctuations in temperature, an adjusting screw threadably mounted on the first one of said diaphragms in the stud of said first diaphragm, a knob on the free end of said adjusting screw, a nut threadably disposed on and normally fixed with respect to said adjusting screw, a switch lever mounted on said adjusting screw, one end of said lever being between said second diaphragm and said microswitch, the distance between said nut on said screw and said stud on said first diaphragm being adjustable through relation of said knob, a spring disposed around said adjusting screw, between said support bracket and said lever on said adjusting screw, holding said switch lever against said nut on said adjusting screw, and said microswitch mounted on said support bracket being provided with a switch point actuable by said switch lever through expansion and contraction of said second diaphragm.

References Cited by the Examiner

UNITED STATES PATENTS

| | | | |
|---|---|---|---|
| 2,514,632 | 7/1950 | Flubacker | 200—83 X |
| 2,555,990 | 6/1951 | Newton | 200—81.5 X |
| 2,878,580 | 3/1959 | Hughes | 200—140 |

BERNARD A. GILHEANY, *Primary Examiner.*

H. M. FLECK, *Assistant Examiner.*